(12) United States Patent
Frye et al.

(10) Patent No.: US 9,329,354 B2
(45) Date of Patent: May 3, 2016

(54) BRANCH DISTRIBUTION CABLE CONNECTORIZATION SYSTEM

(71) Applicant: Corning Optical Communications LLC, Hickory, NC (US)

(72) Inventors: Ryan Everette Frye, Newton, NC (US); Benjamin Gray Whitener, Newton, NC (US)

(73) Assignee: CORNING OPTICAL COMMNICATIONS LLC, Hickory, NC (US)

( * ) Notice: Subject to any disclaimer, the term of this patent is extended or adjusted under 35 U.S.C. 154(b) by 262 days.

(21) Appl. No.: 14/190,764

(22) Filed: Feb. 26, 2014

(65) Prior Publication Data

US 2015/0160424 A1   Jun. 11, 2015

Related U.S. Application Data

(60) Provisional application No. 61/913,623, filed on Dec. 9, 2013.

(51) Int. Cl.
  *G02B 6/44* (2006.01)

(52) U.S. Cl.
  CPC .................................. *G02B 6/4475* (2013.01)

(58) Field of Classification Search
  CPC ............................ G02B 6/4475; G02B 6/4495
  See application file for complete search history.

(56) References Cited

U.S. PATENT DOCUMENTS

| | | | |
|---|---|---|---|
| 7,127,143 B2 | 10/2006 | Elkins, II et al. | 385/100 |
| 7,155,093 B2 | 12/2006 | Elkins, II et al. | 385/100 |
| 7,266,274 B2 | 9/2007 | Elkins, II et al. | 385/100 |
| 7,330,621 B2 | 2/2008 | Elkins, II et al. | 385/100 |
| 7,346,243 B2 | 3/2008 | Cody et al. | 385/100 |
| 7,668,425 B1 * | 2/2010 | Elkins, II | G02B 6/4475 385/100 |
| 7,693,374 B2 | 4/2010 | Cody et al. | 385/100 |
| 8,059,929 B2 | 11/2011 | Cody et al. | 385/100 |
| 2010/0158453 A1 | 6/2010 | Cody et al. | |
| 2010/0290787 A1 | 11/2010 | Cox | |
| 2011/0103761 A1 | 5/2011 | LeBlanc et al. | |
| 2012/0189250 A1 | 7/2012 | Allen et al. | |
| 2013/0251319 A1 | 9/2013 | Compton et al. | |

FOREIGN PATENT DOCUMENTS

WO   WO 2005/119322 A1   12/2005   ............... G02B 6/44

OTHER PUBLICATIONS

Patent Cooperation Treaty, International Search Report, PC/US2014/068328, Mail Date Mar. 30, 2015, 14 pages.

* cited by examiner

*Primary Examiner* — Michelle R Connelly
*Assistant Examiner* — Chad Smith
(74) *Attorney, Agent, or Firm* — William D. Doyle

(57) ABSTRACT

An optic fiber branch distribution cable and system is provided. The branch distribution cable is pre-connectorized. The pre-connectorized branch distribution cable is configured for use in outdoor optical network installations. The branch distribution cable includes a pre-formed, head-end connectorized access point and a pre-formed, rear-end connectorized access point. Each access point includes one or more optical fiber tethers optically coupled at one end to an optical fiber of branch distribution cable and each includes an optical connector at the other end of the tether.

20 Claims, 5 Drawing Sheets

BRANCH DISTRIBUTION CABLE CONNECTORIZATION SYSTEM

RELATED APPLICATION

This application claims the benefit of U.S. Provisional Patent Application No. 61/913,623, filed Dec. 9, 2013, which is incorporated herein by reference in its entirety.

BACKGROUND

Aspects of the present disclosure relate generally to fiber optic cables and systems for the distribution of optical fibers.

Conventional systems may splice on an extension network access cable (e.g., a branch cable) to a primary network access cable (e.g., a trunk cable), to serve a branching fiber run. In addition, in some conventional systems a branching cable may be run in parallel to the existing primary network access cable, back to an aggregated splice point. Such conventional systems may involve the use of splice equipment, trained personnel, and enclosures. The conventional installation methods may also cost much time and money to have multiple branch fibers cables/fibers spliced together to feed subsets of the network (e.g., buildings along side streets). Such multiple splice points may also add complexity to the end-user's network. In some network installations, instead of splicing the branching cables into a primary network access cable, an installer may run one or more lower fiber count cable(s) back to the head-end location. However this type of network arrangement results in more cables to manage at that head-end location and additional time and expense for the installation.

Applicants have identified a need for a pre-connectorized branch cable to provide low fiber count branching. Such a system may reduce or even eliminate the need for splicing lower fiber count branch distribution cables (e.g., 24-48 fiber cables) on to a larger network access cable.

SUMMARY

One embodiment of the disclosure relates to an optical fiber distribution cable. The optical fiber distribution cable includes a plurality of cable optical fibers extending between a first end and a second end of the cable, and each cable optical fiber has a first end located at the first end of the cable and a second end located at the second end of the cable. The optical fiber distribution cable includes a cable jacket surrounding the plurality of cable optical fibers. The optical fiber distribution cable includes a head-end access point located between the first end of the cable and a mid-point of the cable. The head-end access point includes a first access point optical fiber having a first end and a second end. The first end of the first access point optical fiber is optically coupled to a first cable optical fiber of the plurality of cable optical fibers at a point between the first end and a mid-point of the first cable optical fiber, and the second end of the first access point optical fiber is located outside of the cable jacket. The optical fiber distribution cable includes a first optical connector coupled to the second end of the first access point optical fiber. The optical fiber distribution cable includes a rear-end access point located between the mid-point of the cable and the second end of the cable. The rear-end access point includes a second access point optical fiber having a first end and a second end. The first end of the second access point optical fiber is optically coupled to the first cable optical fiber at a point between the mid-point and the second end of the first cable optical fiber, and the second end of the second access point optical fiber is located outside of the cable jacket. The optical fiber distribution cable includes a second optical connector coupled to the second end of the second access point optical fiber. The first cable optical fiber, the head-end access point and the rear-end access point are configured to allow an optical signal to be transmitted through the first access point optical fiber into the first cable optical fiber and through the second access point optical fiber.

Another embodiment of the disclosure relates to an extension fiber optic cable assembly. The extension fiber optic cable assembly includes an extension fiber optic cable having a first end and a second end. The extension fiber optic cable assembly includes a first network access point including a tether having at least one optical fiber. The at least one optical fiber of the tether of the first network access point is optically connected to a corresponding number of optical fibers of the extension fiber optic cable such that an optical signal transmitted through the at least one optical fiber of the tether of the first network access point is likewise transmitted through the corresponding number of optical fibers of the extension fiber optic cable. The extension fiber optic cable assembly includes at least one optical connector coupled to the at least one optical fiber of the tether of the first network access point. The extension fiber optic cable assembly includes a second network access point including a tether having at least one optical fiber. The at least one optical fiber of the tether of the second network access point is optically connected to one or more of the same optical fibers of the extension fiber optic cable to which the at least one optical fiber of the tether of the first network access point is optically connected such that an optical signal transmitted through the at least one optical fiber of the tether of the second network access point is likewise transmitted through the one or more of the same optical fibers of the extension fiber optic cable to which the at least one optical fiber of the tether of the first network access point is optically connected and likewise transmitted through one or more of the at least one optical fiber of the tether of the first network access point. The extension fiber optic cable assembly includes at least one optical connector coupled to the at least one optical fiber of the tether of the second network access point.

Another embodiment of the disclosure relates to an optical communication system. The optical communication system includes a branch fiber optic cable assembly. The branch fiber optic cable assembly includes a branch fiber optic cable having a first end, a second end and a mid-point. The branch fiber optic cable assembly includes a first network access point having a tether having at least one optical fiber. The at least one optical fiber of the tether of the first network access point is optically connected to a corresponding number of optical fibers of the branch fiber optic cable such that an optical signal transmitted through the at least one optical fiber of the tether of the first network access point is likewise transmitted through the corresponding number of optical fibers of the branch fiber optic cable. The first network access point is located between the first end and the mid-point of the branch fiber optic cable. The branch fiber optic cable assembly includes a first optical connector coupled to the at least one optical fiber of the tether of the first network access point. The branch fiber optic cable assembly includes a second network access point having a tether having at least one optical fiber. The at least one optical fiber of the tether of the second network access point is optically connected to one or more of the same optical fibers of the branch fiber optic cable to which the at least one optical fiber of the tether of the first network access point is optically connected such that an optical signal transmitted through the at least one optical fiber of the tether of the second network access point is likewise transmitted through the one or more of the same optical fibers of the branch fiber optic cable to which the at least one optical fiber of the tether of the first network access point is optically connected and likewise transmitted through one or more of the at least one optical fiber of the tether of the first network access point. The branch fiber optic cable assembly includes a second optical connector coupled to the at least one optical fiber of the tether of the second network access point. The optical communication system includes a trunk fiber optic cable assembly optically connected to the branch fiber optic cable assembly. The trunk fiber optic cable assembly includes a trunk fiber optic cable having a first end and a second end. The trunk fiber optic cable assembly includes a third network access point having a tether having at least one optical fiber. The at least one optical fiber of the tether of the third network access point is optically connected to a corresponding number of optical fibers of the trunk fiber optic cable such that an optical signal transmitted through the at least one optical fiber of the tether of the third network access point is likewise transmitted through the corresponding number of optical fibers of the trunk fiber optic cable. The trunk fiber optic cable assembly includes a third optical connector connected to the at least one optical fiber of the tether of the third network access point. The first optical connector is mated with the third optical connector, optically connecting the at least one optical fiber of the tether of the third network access point and the corresponding number of optical fibers of the trunk fiber optic cable with the one or more of the at least one optical fiber of the tether of the first network access point. Through this arrangement an optical signal is likewise transmitted through associated optical fibers of the third network access point, first network access point, the branch fiber optic cable, and the second network access point.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims. The accompanying drawings are included to provide a further understanding and are incorporated in and constitute a part of this specification. The drawings illustrate one or more embodiment(s), and together with the description serve to explain principles and the operation of the various embodiments.

DETAILED DESCRIPTION

Figure 1:
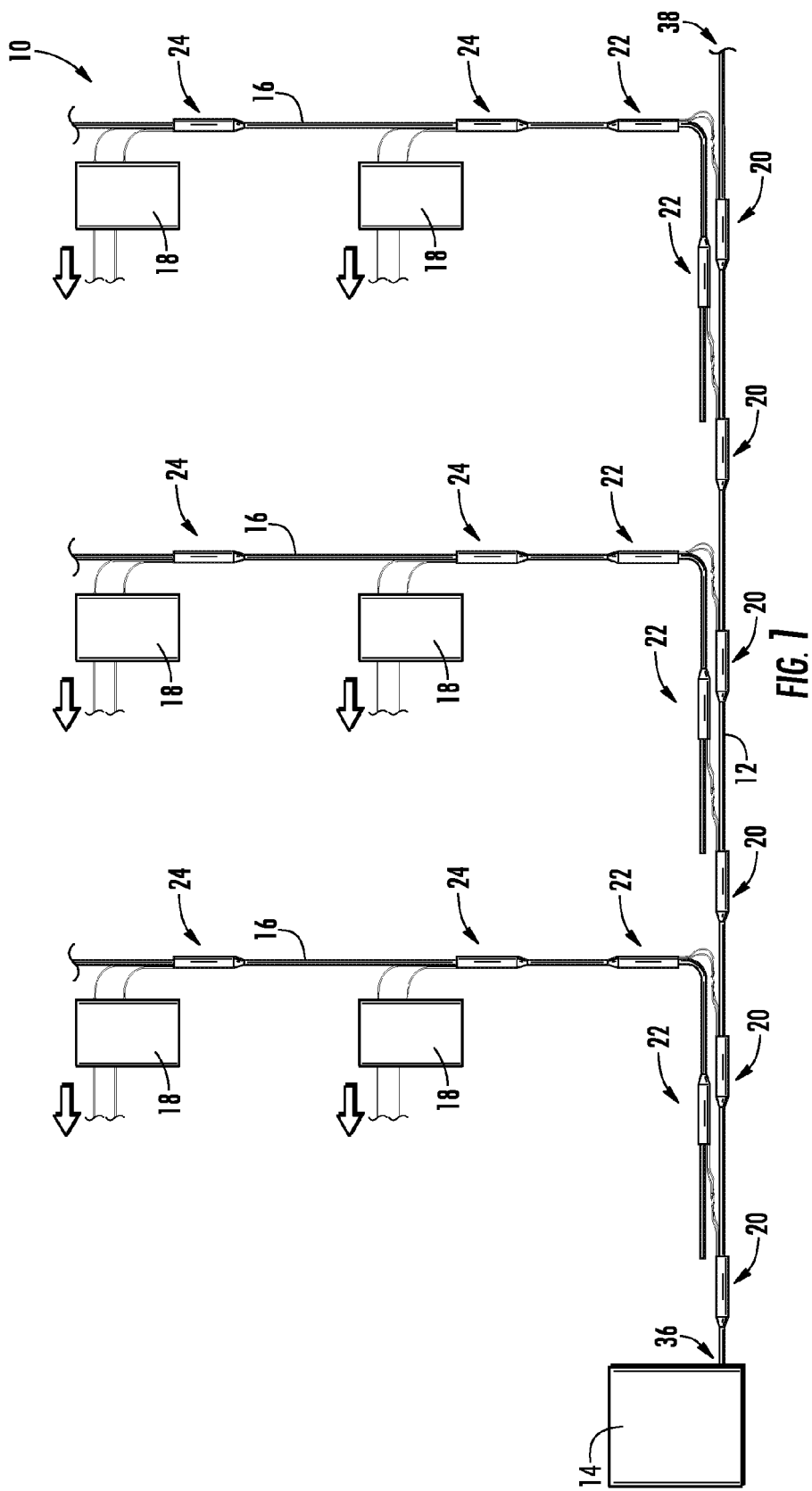
FIG. 1 is schematic diagram of an optical fiber distribution system according to an exemplary embodiment.

Before turning to the Figures, which illustrate exemplary embodiments in detail, it should be understood that the present inventive and innovative technology is not limited to the details or methodology set forth in the Detailed Description or illustrated in the Figures. For example, as will be understood by those of ordinary skill in the art, features and attributes associated with embodiments shown in one of the Figures may be applied to embodiments shown in others of the Figures.

Referring generally to the figures, various embodiments of a pre-connectorized, pre-terminated branch distribution cable and connectorization system are shown. In various embodiments discussed herein, the pre-connectorized branch distribution cable is configured for use in outdoor optical network installations. In general, the branch distribution cable discussed herein includes a pre-formed, head-end connectorized access point and a pre-formed, rear-end connectorized access point. The head-end connectorized access point allows one or more fiber of the branch distribution cable to be connected via mating of an optical connector to one or more fiber of the trunk cable. The rear-end connectorized access point allows one or more fiber of the branch distribution cable to be connected via mating of an optical connector to one or more downstream user (e.g., a subsequent branch optical cable, an end user optical network device, etc.). Thus, the connectorized head-end and rear-end access points allows for deployment of the branch distribution cable of the present application without the need for onsite fiber access and splicing.

In addition, the branch distribution cable discussed herein has a head or feed end that includes a sufficient length of cable (e.g., a length of bare cable) to allow use of a standard cable pulling grip and placing methods. After this length of cable, one or more access points are located along the length of the branch distribution cable (e.g., at mid-span locations). In the various embodiments discussed herein, the access points include one or more optical fiber tethers that are each optically coupled to one of the fibers of the branch distribution cable. Each tether extends out of the cable and includes an optical connector (e.g., a standard outdoor optical connector) at its outer end.

For head-end access points, the optical connector of the tether is configured to mate or connect with a similar connectorized tether extending from and coupled to one or more fibers of a trunk fiber optic cable. At rear-end access points, the optical connector of the tether is configured to mate or connect with a similar connectorized tether extending from and coupled to one or more fibers of a further distribution cable/fiber or an end-user network device. Thus, in this arrangement, the mid-span access point of the branch cable allows for the easy connection of fibers of the branch cable to fibers of the trunk cable or to downstream cables, fibers or devices, without the need to perform onsite mid-span fiber access and splicing typical in many conventional network installations.

In addition, various embodiments of the branch distribution cable discussed herein includes an over-molded cover or shell that surrounds the coupling point between the tether fiber and the corresponding fiber of the branch cable. The connectorized tethers and over-molded cover provides for transition and protection that allows for cable placement in the proper direction.

In contemplated applications, the pre-connectorized mid-span access points of the present application may be used to provide connections and service to higher fiber count cables and arranged to mate up with opposing cable designs. Conventional systems tend to be based around breaking out fibers in a cable for individual connections. The cables in these conventional designs are typically spliced in at the head of the cable. The present inventive technology allows currently-manufactured cables to be pre-connectorized or pre-terminated in such a way that the cable would be "plug-and-play" in the outdoor environment. This technique saves valuable time when installing a network.

For example, the presently disclosed technique may eliminate a need for splicing 24-, 36-, and 48-fiber branch cables on to larger network access cables ("trunk cables"). Further as discussed in more detail below, the cable system discussed herein is configured so that it can be installed using standard commercially available pulling grips without damage to the connectors, cables, fibers, tethers or other components of the access point. Further, the present cable system maintains and/or exceeds the same tensile rating that is used in other traditional outdoor cables. Connectivity in the field will increase deployment speeds and confidence in network deployments. It will also reduce costs due to the added savings in material and skilled labor associated with fiber splicing.

Referring to FIG. 1, an optical communication system or network 10 is shown according to an exemplary embodiment. Network 10 includes a main or trunk fiber optic cable 12 extending from a head-end or central office 14. In general, cable 12 includes a large number of optical fibers (e.g., more than 48 fibers) and is designed to provide optical communication services from central office 14 to a relatively large number of end users. Network 10 includes a plurality of branch distribution cables 16 extending from trunk cable 12.

In general, branch cables 16 are typically lower fiber count optical fiber cables having less fibers than trunk cable 12 (e.g., cables including between 2-48 optical fibers). Branch distribution cables 16 provide communication of optical signals between fibers of trunk cable 12 and a plurality of downstream connections 18. In various embodiments, downstream connections 18 may be various end users (e.g., network devices, cable boxes splitting out network service to a home, office, etc.). In other embodiments, downstream connections 18 may be connections to additional downstream distribution optical fiber cables. For example, in network 10, trunk cable 12 may run along with the utility installation along a main street, and each branch distribution cable 16 may run down a side street to provide network services to homes, offices, buildings, etc. along the side street.

As noted above, the optical fiber cables of network 10 are pre-terminated and pre-connectorized allowing for easier onsite deployment of network communication services via optical fiber cables 12 and 16. Specifically, trunk cable 12 includes a plurality of branch access points 20. In addition, branch distribution cables 16 include a plurality of "head-end" access points 22 (e.g., "feeder" end tether access point or TAPs) configured to couple to and receive optical fiber signals from corresponding access points 20 of trunk cable 12.

Branch distribution cables 16 also include a plurality of "rear-end" access points 24 (e.g., a tail-end tether access point or TAPs) configured to couple to and provide optical fiber signals to downstream users 18. In general, access points 22 and 24 are pre-engineered or pre-manufactured along the length of branch distribution cables 16 eliminating the need for access and splicing of fibers of cables 16 onsite (e.g., in the field during deployment of the optical network).

Figure 2:
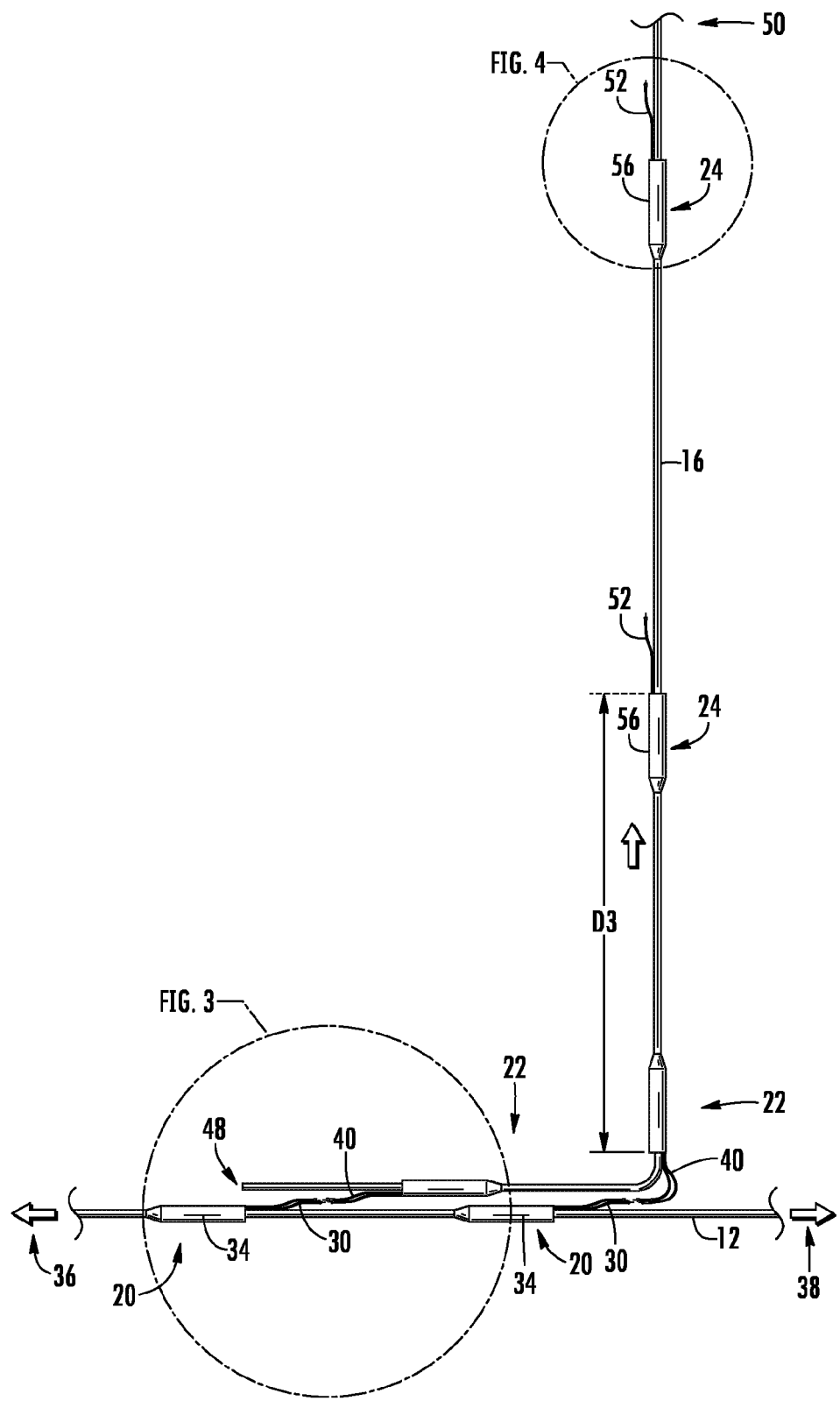
FIG. 2 is a schematic diagram of a branch distribution connectorization system according to an exemplary embodiment.
Figure 3:
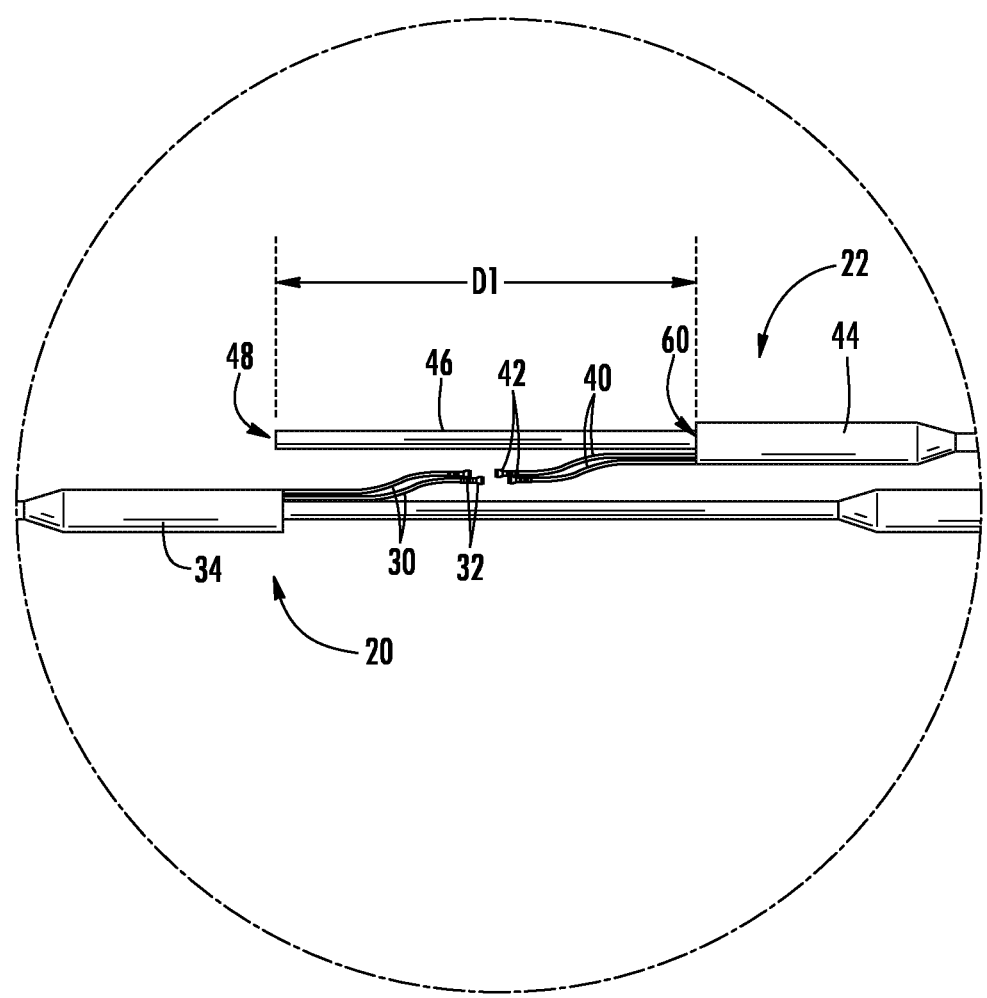
FIG. 3 is a detailed view of a connectorized head-end connection point of the system of FIG. 2 according to an exemplary embodiment.

Referring to FIG. 2 and to FIG. 3, head-end access points 22 of branch distribution cable 16 and coupling with fibers of trunk cable 12 are shown in more detail. Access points 20 of trunk cable 12 include one or more tethers 30 extending out of each access point 20. Tethers 30 include one or more optical fibers that are spliced or otherwise connected to one or more optical fiber of trunk cable 12 at one end, and each tether 30 includes an optical connector 32 coupled to the other end of the optical fiber of tether 30. An over-molded cover or shell 34 surrounds the splice point between tethers 30 and the corresponding fiber of trunk cable 12 and also surrounds a portion of the length of tethers 30. In general, cover 34 protects and supports tethers 30.

Trunk cable 12 has a first end, shown as head end 36, and a second end, shown as tail end 38. Tethers 30 extend from cover 34 such that tethers 30 extend toward tail end 38 and away from head 36. This arrangement provides for convenient coupling with the tethers of branch distribution cables 16. In various embodiments, the tethers and access points discussed herein may be tethers or access points as shown in U.S. Pat. No. 7,127,143 which is incorporated in herein by reference in its entirety.

Head-end access points 22 of branch distribution cable 16 each include one or more tethers 40 extending out of access point 22. Tethers 40 include one or more optical fibers that are spliced or otherwise connected to one or more optical fiber of branch cable 16 at one end, and each tether 40 includes an optical connector 42 coupled to the other end of the optical fiber of the tether. An over-molded cover or shell 44 surrounds the splice point between tethers 40 and the corresponding fiber of branch cable 16 and also surrounds a portion of the length of tethers 40.

Cover 44 is also coupled to and surrounds cable jacket 46 of branch cable 16. In general, cover 44 protects and supports tethers 40. As shown in FIG. 3, the second end of tether 40 and connector 42 is located outside of cable jacket 46 and outside of cover 44.

Branch cable 16 has a first end, shown as head end 48, and a second end, shown as tail end 50. Tethers 40 extend from cover 44 such that tethers 40 extend toward head end 48 and away from tail end 50. In this arrangement tethers 40 are facing tethers 30 of trunk cable 12 and are facing the head-end/central office side of trunk cable 12, which is opposite of may conventional cable orientations.

Figure 4:
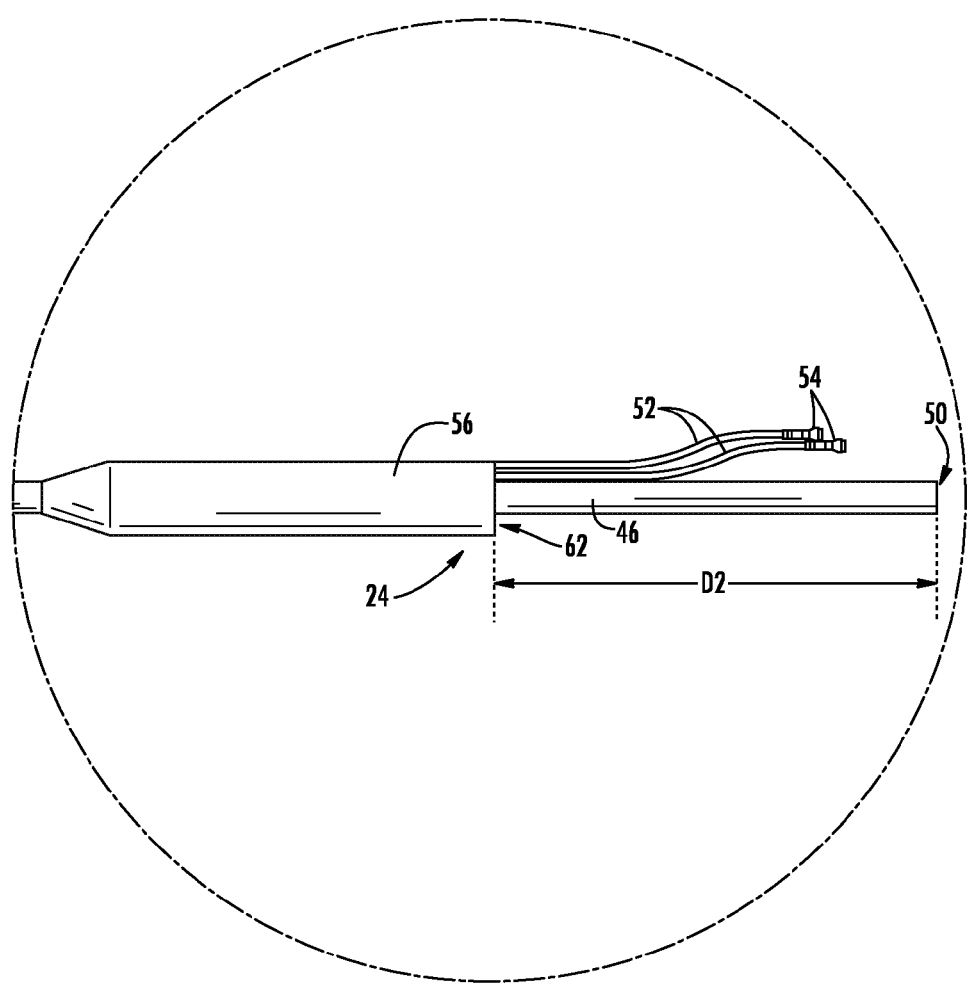
FIG. 4 is a detailed view of a connectorized rear-end connection point of the system of FIG. 2 according to an exemplary embodiment.

Rear-end access points 24 of branch distribution cable 16 each include one or more tethers 52 extending out of access points 24. Tethers 52 include one or more optical fibers that are spliced or otherwise connected to one or more optical fiber of branch cable 16 at one end, and each tether 52 includes an optical connector 54 coupled to the other end of the optical fiber of the tether. An over-molded cover or shell 56 surrounds the splice point between tethers 52 and the corresponding fiber of branch cable 16 and also surrounds a portion of the length of tethers 52. Cover 56 is also coupled to and surrounds cable jacket 46 of branch cable 16. In general, cover 56 protects and supports tethers 52. As shown in FIG. 4, the second end of tether 52 and connector 54 is located outside of cable jacket 46 and outside of covers 56.

In the embodiment shown, each head-end access point 22 of branch distribution cable 16 includes a limited number of tethers 40, and in the specific embodiment, each head-end access point 22 of branch distribution cable 16 includes two tethers 40. Thus, in some such embodiments, multiple head-end access points 22 are needed to serve or feed each fiber of branch cable 16 from trunk cable 12. Similarly, in the embodiment shown, each rear-end access point 24 of branch distribution cable 16 includes a limited number of tethers 52, and in the specific embodiment, each rear-end access point 24 of branch distribution cable 16 includes two tethers 52. In such embodiments, limiting the number of tethers at each access point of branch cable 16 allows the cross-sectional dimension of the access point to be made small enough to allow branch cable 16 to be used in conjunction with standard installation equipment (e.g., standard lashing and anchoring equipment). In various embodiments, covers 44 and 56 are molded polymer covers sized and configured to protect tethers 40 and 52 while maintaining a sufficiently small cross-sectional dimension to allow for installation via standard installation equipment. In various embodiments, the cross-sectional thickness or diameter of covers 44 and 56 is between 20 mm and 60 mm, and more specifically between 28 mm and 50 mm.

In general referring to the head-end connection between trunk cable 12 and branch cable 16 shown in FIG. 3, connectors 32 and 42 are configured to engage each other to provide optical connection between the optical fibers of tethers 30 and tethers 40. Thus, upon coupling of one connector 32 to a connector 42, an optical signal carried by the fiber of trunk cable 12 attached to tether 30 is transmitted through tether 30 to tether 40 and to the corresponding fiber of branch cable 16 coupled to tether 40. The optical signal is then carried through the fiber of branch cable 16 and through the fiber of the tether 52 coupled to the same fiber. Connector 54 of the tether 52 is connected to a downstream user as discussed above such that the optical signal is communicated to the downstream user.

In various embodiments, connectors 32, 42 and 54 are optical connectors configured for use in an outdoor environment. In various embodiments, connectors 32 and 42 are connectors configured to plug or mate together. In one embodiment, connector 32 is a male, outdoor pinned connector, and connector 42 is a female, pin-less outdoor connector. In such embodiments, connectors 32 and 42 are configured with various sealing structures (e.g., O-rings) such that a water-tight seal is formed upon engagement of connectors 32 and 42. Conventional cable assembly may only be available with pinned outdoor connectors; while the proposed cable system will use pinless outdoor connectors to connect to the traditional pinned connectors. However, in some embodiments, the pin/pin-less orientation of the mating connectors of FIG. 3 may be reversed. In various embodiments, connectors 32, 42 and 54 are any suitable optical connector, such as but not limited to SC, LC, DC, FC, ST, SC/DC, MT-RJ, MTP, MPO and other like single or multi-fiber ferrules now known or hereafter developed. According to an exemplary embodiment, the connector ends of tethers 40 and 52 are covered by a heat shrink or other protective boot to maintain assembly integrity and allow installation through placing blocks/rollers and/or ducts.

In various embodiments, the access points and tethers of branch distribution cable 16 are configured and arranged to facilitate coupling with trunk cable 12 and/or downstream users 18. For example as shown, tethers 40 extend toward head end 48 of branch cable 16, and tethers 52 extend toward tail end 50 of branch cable 16. Thus, in this arrangement tethers 40 and 52 extend in opposite directions from each other. In addition, tethers 40 and 52 are configured to have sufficient length to allow for convenient coupling to trunk cable 12 or downstream users 18, respectively. In various embodiments, tethers 40 and 52 range in length from 2 feet to 30 feet, and more specifically are between 5 feet and 20 feet. In such embodiments as shown in FIGS. 2-4, at least a portion of tethers 40 and tethers 52 extend lengthwise along an exterior surface of cable jacket 46.

In various embodiments, tethers 40 and 52 may each include between 1 and 12 optical fibers. Accordingly, in embodiments in which each head-end access point 22 includes two tethers 40, each head-end access point 22 can feed fiber optic communication to a maximum of 24 fibers of branch cable 16. According, as shown in FIG. 2, if branch cable 16 is a 48 fiber branch distribution cable, two head-end access points 22 are used to feed fiber optic communication to all 48 fibers of branch cable 16. In other embodiments, branch distribution cable 16 may include more or less than 48 fibers, and the tether fiber counts and the number of head-end access points used to feed the branch distribution cable may be altered as needed.

In various embodiments, covers 44 and 56 are sized and shaped to direct and position tethers 40 and 52 as discussed above. In various embodiments, covers 44 include a first end 60 that is substantially perpendicular to the outer surface of cable jacket 46 and that faces toward head end 48. In such embodiments, tethers 40 extend from covers 44 through end 60. In various embodiments, covers 56 include a first end 62 that is substantially perpendicular to the outer surface of cable jacket 46 and that faces toward tail end 50. In such embodiments, tethers 52 extend from covers 56 through end 62.

As noted above, both head-end access points 22 and rear-end access points 24 are mid-span access points. In such embodiments, a distance D1 of cable length is located between head end 48 and the first head-end access point 22. In various embodiments, D1 is greater than 1 meter. In various embodiments, the length of cable shown as D1 is selected to be sufficient to allowing engagement with standard cable placement or installation methods including a standard pulling grip used during installation.

In addition, in various embodiments, a distance D2 of cable length is located between tail end 50 and the last rear-end access point 24. In various embodiments, D2 is greater than 1 meter. In various embodiments, a distance D3 of cable length is located between the last head-end access point 22 and the first rear-end access point 24. In various embodiments, D3 is greater than 30 meters. In various embodiments, D3 is between 50 and 100 feet. In another embodiment, D3 is between 200 and 500 feet. In various embodiments, the total length of cable 16 is between 200 and 5000 feet.

Figure 5:
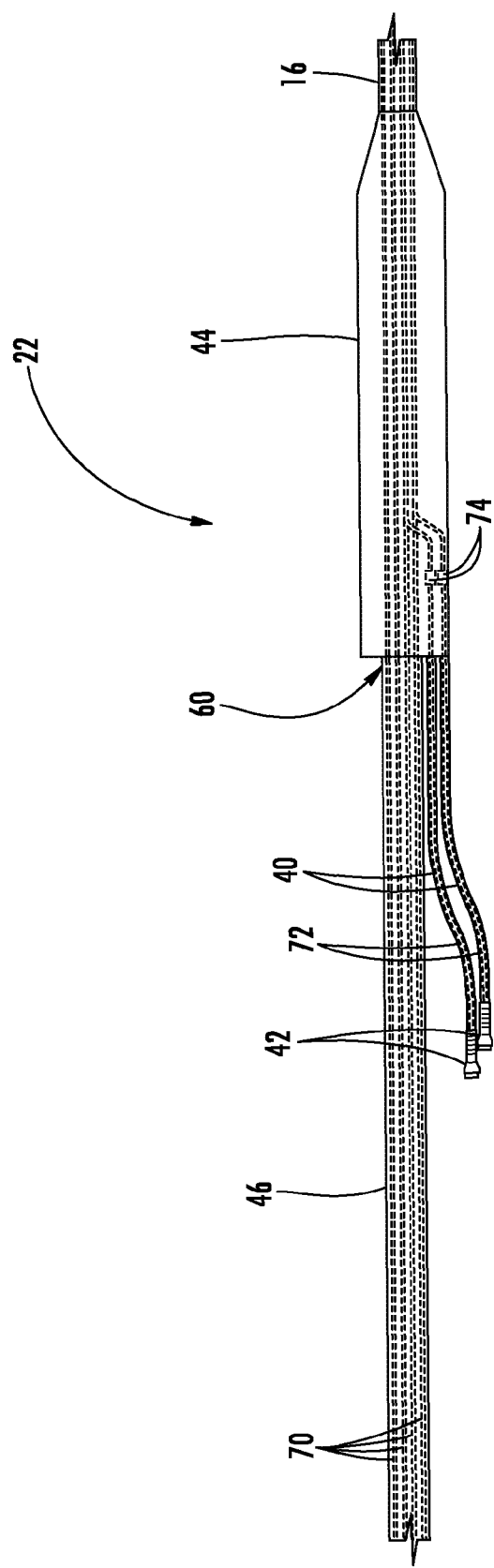
FIG. 5 is a schematic view showing optical coupling between a tether and a cable optical fiber of a branch cable within a network access point according to an exemplary embodiment.

Referring to FIG. 5, a detailed schematic view of head end access point 22 is shown according to an exemplary embodiment. As shown, branch cable 16 includes a plurality of cable optical fibers 70 located within cable jacket 46, represented by dotted lines in FIG. 5. Cable optical fibers 70 extend the length of branch cable 16 between head end 48 and tail end 50 (shown in FIG. 2). Tethers 40 each include a tether optical fiber 72. Tether optical fibers 72 are each coupled to cable optical fibers 70 at optical coupling or connection points 74. In various embodiments, optical coupling or connection points 74 are spliced connection points. In the embodiment shown, a portion of cable optical fibers 70 are broken out of the fiber bundle within branch cable 16 to connect to tether optical fibers 72. As shown, optical coupling points 74 are located within cover 44, such that cover 44 provides support and protection for coupling points 74. It should be understood that the tether to cable fiber connection shown in FIG. 5 are representative of the tether to cable fiber connections within access points 20, 22 and 24. In one embodiment, the tether to cable fiber connections discussed herein are formed and structured as shown in U.S. Pat. No. 7,127,143, which is incorporated in herein by reference in its entirety.

Referring to FIG. 1 and the corresponding above discussion, this design differs from the many conventional systems because: (1) conventional systems tend to be based around breaking out fibers in a cable for individual connections; (2) conventional systems may be required to be spliced in at the head of the cable, like traditional cables, but the present inventive system allows currently manufactured cables to become pre-terminated in such a way that would deem them plug-and-play in the outdoor environment, as shown in FIG.

1; (3) this technique may reduce or even eliminate splice points and redundant cable routes, saving valuable time when installing a network. In some embodiments, the present inventive technology uses the feeder location to provide an all-connectorized solution. In some embodiments, the present inventive technology uses fibers coming from one direction with the tether facing the same direction, but backwards from the traditional direction of toward-the-subscriber, as shown in FIG. 1. In some embodiments, the present inventive technology is completely pre-connectorized (e.g., terminated in factory) for interconnection in the field (e.g., where installed and used).

As will be understood, the optical fibers of the cables discussed herein include optical fibers that may be flexible, transparent optical fibers made of glass or plastic. The fibers may function as a waveguide to transmit light between the two ends of the optical fiber. Optical fibers may include a transparent core surrounded by a transparent cladding material with a lower index of refraction. Light may be kept in the core by total internal reflection. Glass optical fibers may comprise silica, but some other materials such as fluorozirconate, fluoroaluminate and chalcogenide glasses, as well as crystalline materials such as sapphire, may be used. The light may be guided down the core of the optical fibers by an optical cladding with a lower refractive index that traps light in the core through total internal reflection. The cladding may be coated by a buffer and/or another coating(s) that protects it from moisture and/or physical damage. These coatings may be UV-cured urethane acrylate composite materials applied to the outside of the optical fiber during the drawing process. The coatings may protect the strands of glass fiber.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. An optical fiber distribution cable comprising:
   a plurality of cable optical fibers extending between a first end and a second end of the cable, each cable optical fiber having a first end located at the first end of the cable and a second end located at the second end of the cable;
   a cable jacket surrounding the plurality of cable optical fibers;
   a head-end access point located between the first end of the cable and a mid-point of the cable, the head-end access point comprising:
      a first access point optical fiber having a first end and a second end, wherein the first end of the first access point optical fiber is optically coupled to a first cable optical fiber of the plurality of cable optical fibers at a point between the first end and a mid-point of the first cable optical fiber, wherein the second end of the first access point optical fiber is located outside of the cable jacket; and
      a first optical connector coupled to the second end of the first access point optical fiber; and
   a rear-end access point located between the mid-point of the cable and the second end of the cable, the rear-end access point comprising:
      a second access point optical fiber having a first end and a second end, wherein the first end of the second access point optical fiber is optically coupled to the first cable optical fiber at a point between the mid-point and the second end of the first cable optical fiber, wherein the second end of the second access point optical fiber is located outside of the cable jacket; and
      a second optical connector coupled to the second end of the second access point optical fiber;
   wherein the first cable optical fiber, the head-end access point and the rear-end access point are configured to allow an optical signal to be transmitted through the first access point optical fiber into the first cable optical fiber and through the second access point optical fiber.

2. The optical fiber distribution cable of claim 1 wherein the first access point optical fiber extends toward the first end of the cable and the second access point optical fiber extends toward the second end of the cable.

3. The optical fiber distribution cable of claim 2 wherein at least a portion of the first access point optical fiber extends lengthwise along an exterior surface of the cable jacket toward the first end of the cable, wherein at least a portion of the second access point optical fiber extends lengthwise along the exterior of the cable jacket toward the second end of the cable.

4. The optical fiber distribution cable of claim 1 further comprising:
   a first cover coupled to the cable jacket, the first cover surrounding a portion of the first access point optical fiber and surrounding the optical coupling between the first access point optical fiber and the first cable optical fiber; and
   a second cover coupled to the cable jacket, the second cover surrounding a portion of the second access point optical fiber and surrounding the optical coupling between the second access point optical fiber and the first cable optical fiber.

5. The optical fiber distribution cable of claim 4 wherein the first cover includes a first end facing the first end of the cable, wherein the first access point optical fiber extends from the first end of the first cover toward the first end of the cable, wherein the second cover includes a first end facing the second end of the cable, wherein the second access point optical fiber extends from the first end of the second cover toward the second end of the cable.

6. The optical distribution cable of claim 5 wherein the first cover and the second cover are molded polymer covers.

7. The optical distribution cable of claim 5 wherein the first access point optical fiber is spliced to the first cable optical fiber and the first cover surrounds the splice between the first access point optical fiber and the first cable optical fiber, wherein the second access point optical fiber is spliced to the first cable optical fiber and the second cover surrounds the splice between the second access point optical fiber and the first cable optical fiber.

8. The optical distribution cable of claim 5 further comprising:
   a third access point optical fiber extending from the first end of the first cover toward the first end of the cable, wherein a first end of the third access point optical fiber is optically coupled to a second cable optical fiber of the plurality of cable optical fibers at a point between the first end and a mid-point of the second cable optical fiber, wherein a second end of the third access point optical fiber is located outside of the cable jacket and is coupled to a third optical connector; and a fourth access point optical fiber extending from the first end of the second cover toward the second end of the cable, wherein a first end of the fourth access point optical fiber is optically coupled to the second cable optical fiber at a point between the second end and the mid-point of the second cable optical fiber, wherein a second end of the fourth access point optical fiber is located outside of the cable jacket and is coupled to a fourth optical connector.

9. The optical fiber distribution cable of claim 1 wherein the first optical connector and the second optical connector are pin-less optical connectors.

10. The optical fiber distribution cable of claim 1 wherein the head-end access point is at least 1 meter from the first end of the cable, wherein the rear-end access point is at least one meter from the second end of the cable.

11. The optical fiber distribution cable claim 10 wherein at least 30 meters of the length of the cable is located between the head-end access point and the rear-end access point.

12. An extension fiber optic cable assembly, comprising:
an extension fiber optic cable having a first end and a second end;
a first network access point comprising a tether having at least one optical fiber, wherein the at least one optical fiber of the tether of the first network access point is optically connected to a corresponding number of optical fibers of the extension fiber optic cable such that an optical signal transmitted through the at least one optical fiber of the tether of the first network access point is likewise transmitted through the corresponding number of optical fibers of the extension fiber optic cable;
at least one optical connector coupled to the at least one optical fiber of the tether of the first network access point;
a second network access point comprising a tether having at least one optical fiber, wherein the at least one optical fiber of the tether of the second network access point is optically connected to one or more of the same optical fibers of the extension fiber optic cable to which the at least one optical fiber of the tether of the first network access point is optically connected such that an optical signal transmitted through the at least one optical fiber of the tether of the second network access point is likewise transmitted through the one or more of the same optical fibers of the extension fiber optic cable to which the at least one optical fiber of the tether of the first network access point is optically connected and likewise transmitted through one or more of the at least one optical fiber of the tether of the first network access point; and
at least one optical connector coupled to the at least one optical fiber of the tether of the second network access point.

13. The extension fiber optic cable assembly of claim 12 wherein the first and second network access points are at intermediate locations along the length of the extension fiber optic cable, each being a distance of at least one meter away from the first and second ends of the extension fiber optic cable.

14. The extension fiber optic cable assembly of claim 13 wherein the first and second network access points are spaced apart from one another by a lengthwise distance of at least 30 meters along the extension fiber optic cable.

15. The extension fiber optic cable assembly of claim 14 wherein the tether of the first network access point and the tether of the second access point are directed lengthwise along the extension fiber optic cable in opposite directions from one another.

16. The extension fiber optic cable assembly of claim 15 further comprising a first cover molded over at least a portion of the tether of the first network access point and a second cover molded over at least a portion of the tether of the second network access point.

17. An optical communication system, comprising:
a branch fiber optic cable assembly comprising:
a branch fiber optic cable having a first end, a second end and a mid-point;
a first network access point comprising a tether having at least one optical fiber, wherein the at least one optical fiber of the tether of the first network access point is optically connected to a corresponding number of optical fibers of the branch fiber optic cable such that an optical signal transmitted through the at least one optical fiber of the tether of the first network access point is likewise transmitted through the corresponding number of optical fibers of the branch fiber optic cable, wherein the first network access point is located between the first end and the mid-point of the branch fiber optic cable;
a first optical connector coupled to the at least one optical fiber of the tether of the first network access point;
a second network access point comprising a tether having at least one optical fiber, wherein the at least one optical fiber of the tether of the second network access point is optically connected to one or more of the same optical fibers of the branch fiber optic cable to which the at least one optical fiber of the tether of the first network access point is optically connected such that an optical signal transmitted through the at least one optical fiber of the tether of the second network access point is likewise transmitted through the one or more of the same optical fibers of the branch fiber optic cable to which the at least one optical fiber of the tether of the first network access point is optically connected and likewise transmitted through one or more of the at least one optical fiber of the tether of the first network access point; and
a second optical connector coupled to the at least one optical fiber of the tether of the second network access point;
a trunk fiber optic cable assembly optically connected to the branch fiber optic cable assembly, the trunk fiber optic cable assembly comprising:
a trunk fiber optic cable having a first end and a second end; and
a third network access point comprising a tether having at least one optical fiber, wherein the at least one optical fiber of the tether of the third network access point is optically connected to a corresponding number of optical fibers of the trunk fiber optic cable such that an optical signal transmitted through the at least one optical fiber of the tether of the third network access point is likewise transmitted through the corresponding number of optical fibers of the trunk fiber optic cable,
a third optical connector connected to the at least one optical fiber of the tether of the third network access point; and wherein the first optical connector is mated with the third optical connector, optically connecting the at least one optical fiber of the tether of the third network access point and the corresponding number of optical fibers of the trunk fiber optic cable with the one or more of the at least one optical fiber of the tether of the first network access point, whereby an optical signal is likewise transmitted through associated optical fibers of the third network access point, first network access point, the branch fiber optic cable, and the second network access point.

18. The optical communication system of claim 17 wherein the third connector is a pinned connector and the first connector is a pin-less connector.

19. The optical communication system of claim 17 wherein the number of optical fibers within the trunk fiber optic cable is greater than the number of optical fibers within the branch fiber optic cable.

20. The optical communication system of claim 17 wherein the tether of the third network access point extends in a direction away from the first end of the trunk fiber optic cable toward the second end of the trunk fiber optic cable, wherein the tether of the first network access point extends in a direction away from the second end of the branch fiber optic cable toward the first end of the branch fiber optic cable, wherein the tether of the second network access point extends in a direction away from the first end of the branch fiber optic cable toward the second end of the branch fiber optic cable.

* * * * *